(12) United States Patent  (10) Patent No.: US 9,313,825 B2
Ganton et al.  (45) Date of Patent: *Apr. 12, 2016

(54) MULTI-MODE HANDHELD APPARATUS

(71) Applicant: MARVELL WORLD TRADE LTD., St. Michael (BB)

(72) Inventors: Robert B. Ganton, San Diego, CA (US); Paramesh Gopi, Cupertino, CA (US)

(73) Assignee: MARVELL WORLD TRADE LTD. (BB)

( * ) Notice: Subject to any disclaimer, the term of this patent is extended or adjusted under 35 U.S.C. 154(b) by 0 days.

This patent is subject to a terminal disclaimer.

(21) Appl. No.: 14/305,312

(22) Filed: Jun. 16, 2014

(65) Prior Publication Data

US 2014/0295914 A1 Oct. 2, 2014

Related U.S. Application Data

(63) Continuation of application No. 11/841,504, filed on Aug. 20, 2007, now Pat. No. 8,755,835.

(60) Provisional application No. 60/823,191, filed on Aug. 22, 2006.

(51) Int. Cl.
*H04B 1/02* (2006.01)
*H04B 1/04* (2006.01)
*H04M 1/00* (2006.01)
*H04W 4/00* (2009.01)
*H04B 7/212* (2006.01)
*H04W 88/06* (2009.01)

(52) U.S. Cl.
CPC .......... *H04W 88/06* (2013.01); *H04M 2250/02* (2013.01); *H04M 2250/06* (2013.01); *H04M 2250/10* (2013.01)

(58) Field of Classification Search
CPC ..... H04W 88/06; H04W 64/00; H04W 36/08; H04B 1/406
USPC ................ 455/435.2–435.3, 450, 451, 452.1, 455/127.4, 553.1, 552.1
See application file for complete search history.

(56) References Cited

U.S. PATENT DOCUMENTS

| 6,842,607 | B2 | 1/2005 | Godfrey et al. |
| 7,046,649 | B2 | 5/2006 | Atwater et al. |
| 7,440,730 | B2 | 10/2008 | Aloni-Lavi et al. |
| 7,653,038 | B2 | 1/2010 | Chung et al. |
| 7,710,923 | B2 | 5/2010 | Carlton |
| 7,844,222 | B2 * | 11/2010 | Grushkevich ................ 455/41.2 |
| 8,364,080 | B2 * | 1/2013 | Desai et al. ................. 455/41.2 |
| 2001/0010689 | A1 * | 8/2001 | Awater et al. ................ 370/344 |
| 2004/0048572 | A1 * | 3/2004 | Godfrey ...................... 455/41.2 |
| 2004/0170122 | A1 | 9/2004 | Guo et al. |
| 2004/0246898 | A1 * | 12/2004 | Peisa .................... H04L 1/1835 370/235 |
| 2005/0020299 | A1 | 1/2005 | Malone et al. |

(Continued)

FOREIGN PATENT DOCUMENTS

EP 1 119 137 A 7/2001
EP 1 583 295 A 10/2005
EP 1583295 A2 * 10/2005 ............. H04L 12/56

*Primary Examiner* — Dung Hong

(57) ABSTRACT

A multi-mode handheld apparatus may incorporate a radio element that is operative in accordance with a plurality of communication standards. A coexistence engine may arbitrate access to resources of the radio element by media access controllers and baseband components.

17 Claims, 5 Drawing Sheets

(56) References Cited

U.S. PATENT DOCUMENTS

| | | |
|---|---|---|
| 2005/0070280 A1 | 3/2005 | Jung et al. |
| 2005/0135406 A1 | 6/2005 | Fleming |
| 2005/0147071 A1 | 7/2005 | Karaoguz et al. |
| 2005/0250468 A1 | 11/2005 | Lu et al. |
| 2007/0049216 A1 * | 3/2007 | Karaoguz .................... 455/90.3 |
| 2008/0043705 A1 | 2/2008 | Desai et al. |

* cited by examiner

MULTI-MODE HANDHELD APPARATUS

CROSS-REFERENCE TO RELATED APPLICATIONS

This patent disclosure is a continuation of U.S. patent application Ser. No. 11/841,504 filed on Aug. 20, 2007, now U.S. Pat. No. 8,755,835; which claims the benefit of U.S. provisional application Ser. No. 60/823,191, filed Aug. 22, 2006, the disclosures of which are wholly incorporated herein by reference.

BACKGROUND

1. Field of the Disclosure

Aspects of the present disclosure relate generally to handset apparatus for use in communication systems, and more particularly to a multi-mode wireless handheld apparatus incorporating a radio component operative in accordance with a plurality of communication standards.

2. Description of Related Art

Recently, the Worldwide Interoperability for Microwave Access (or "WiMAX") communication standard, as promoted by the Institute of Electrical and Electronics Engineers (IEEE) and defined by the IEEE 802.16 specification, has emerged as a potential replacement or overlay for traditional cellular wireless service. As is known in the art, the IEEE 802.11 standard (generally known as Wireless Fidelity, or "WiFi") may support Voice over Internet Protocol (VoIP) for handheld apparatus and other wireless devices. It is expected that future consumer and industry demand will require that wireless devices be capable of operating in more than one mode, e.g., WiFi and WiMAX, or WiFi and cellular. Conventional implementations generally require multiple transceivers, each of which is operative to support a specific communication standard. Interaction between multiple radio elements in a single device, however, can create interference and other deleterious effects that limit the utility of the device, its useful range, or both; inter-radio interference is especially problematic where individual receivers, transmitters, or both are manufactured independently (e.g., on different chips) and perhaps by different manufacturers. Additionally, current technology generally does not permit implementation of a WiFi transceiver in WiMAX mode, for example, and vice-versa. While these communication standards, or modes, are similar, sufficient differences exist to limit the ability of one transceiver which is dedicated to operate in one particular mode (e.g., WiFi) from operating in the other mode (e.g., WiMAX).

Similarities between the WiFi and WiMAX standards generally include basebands and overall bandwidth requirements, media access control (MAC) elements, channel size and spacing, as well as hardware components and protocol stacks which support various operational characteristics; for example, both modes represent multi-in, multi-out (MIMO) technologies. Despite the similarities between WiFi and WiMAX implementations, conventional devices that have been constructed to operate in both modes have nevertheless not taken advantage of these similarities, and continue to rely upon multiple transceivers which typically interfere. Further, while it may be desirable in some situations to allow an apparatus to share resources such as memory between a WiFi transceiver and a WiMAX transceiver, conventional implementations have failed to do so efficiently.

Hence, it may be desirable to provide a multi-mode wireless handheld apparatus incorporating a multi-mode wireless radio that can operate in accordance with various communication standards interchangeably.

SUMMARY

Embodiments of the present disclosure provide a multi-mode wireless handheld apparatus incorporating a radio element operative in accordance with a plurality of communication standards. In accordance with one aspect of the disclosure, a coexistence engine arbitrates resources of the radio element.

In accordance with another aspect, an apparatus is disclosed that comprises a radio frequency (RF) component; a first media access controller (MAC) and a first baseband (BB) configured to allow the radio frequency (RF) component to communicate in accordance with a first wireless communication standard, wherein the first media access controller is further configured to generate data predicting transmission as required by the first baseband. The apparatus includes a second media access controller (MAC) and a second baseband (BB) configured to allow the radio frequency (RF) component to communicate in accordance with a second wireless communication standard, wherein the second wireless communication standard is different from the first wireless communication standard. A coexistence engine is configured to arbitrate, based at least in part on the data predicting transmission as required by the first baseband, access of the radio frequency (RF) component to (i) the first media access controller (MAC) and the first baseband (BB) or (ii) the second media access controller (MAC) and the second baseband (BB).

In accordance with another aspect, a method is disclosure for arbitrating access of a radio frequency (RF) component to (i) a first media access controller (MAC) and a first baseband (BB) or (ii) a second media access controller (MAC) and a second baseband (BB), wherein the first media access controller (MAC) and the first baseband (BB) are configured to allow the radio frequency (RF) component to communicate in accordance with a first wireless communication standard, wherein the second media access controller (MAC) and the second baseband (BB) are configured to allow the radio frequency (RF) component to communicate in accordance with a second wireless communication standard different from the first wireless communication standard. The method comprises generating data predicting transmission as required by the first baseband; and arbitrating, based at least in part on the data predicting transmission as required by the first baseband, access of the radio frequency (RF) component to (i) the first media access controller (MAC) and the first baseband (BB) or (ii) the second media access controller (MAC) and the second baseband (BB).

In accordance with another aspect of the disclosure, a computer program is tangibly stored on a non-transitory computer readable medium, for arbitrating access of a radio frequency (RF) component to (i) a first media access controller (MAC) and a first baseband (BB) or (ii) a second media access controller (MAC) and a second baseband (BB), wherein the first media access controller (MAC) and the first baseband (BB) are configured to allow the radio frequency (RF) component to communicate in accordance with a first wireless communication standard, wherein the second media access controller (MAC) and the second baseband (BB) are configured to allow the radio frequency (RF) component to communicate in accordance with a second wireless communication standard different from the first wireless communication standard. The computer program comprises instructions, executable by a processor, to: generate data predicting transmission as required by the first baseband; and arbitrate, based at least in part on the data predicting transmission as required by the first baseband, access of the radio frequency (RF) component to (i) the first media access controller (MAC) and the first baseband (BB) or (ii) the second media access controller (MAC) and the second baseband (BB).

The foregoing and other aspects of various embodiments of the present disclosure will be apparent through examination of the following detailed description thereof in conjunction with the accompanying drawing figures.

BRIEF DESCRIPTION OF THE DRAWING FIGURES

DETAILED DESCRIPTION

Introduction

Figure 1:
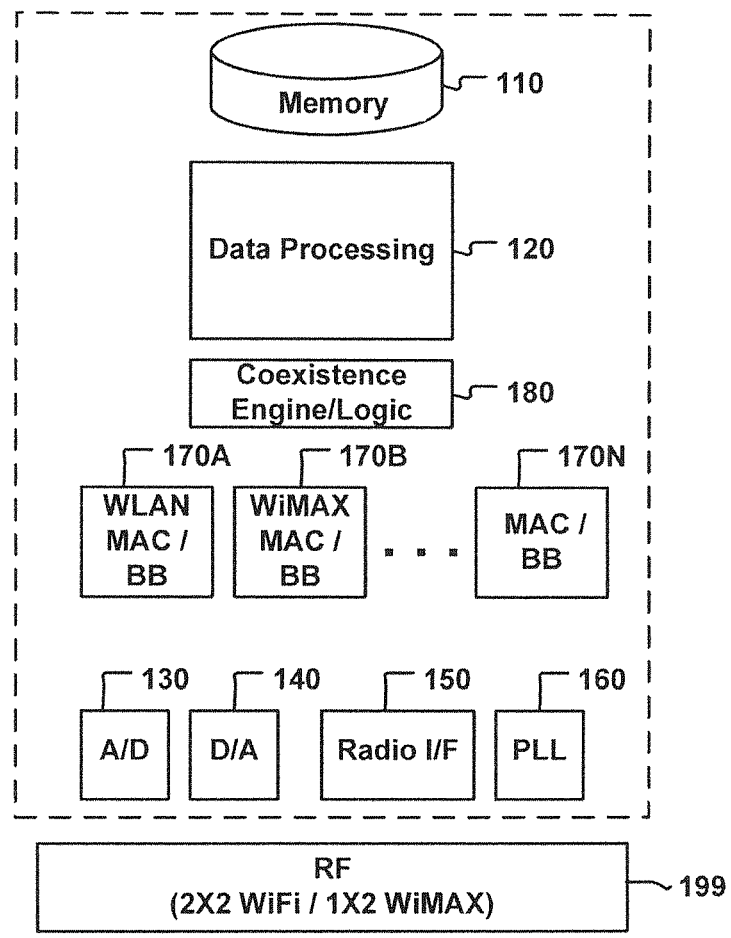
FIG. 1 is a simplified block diagram illustrating components of one embodiment of a multi-mode wireless handheld apparatus.
Figure 2:
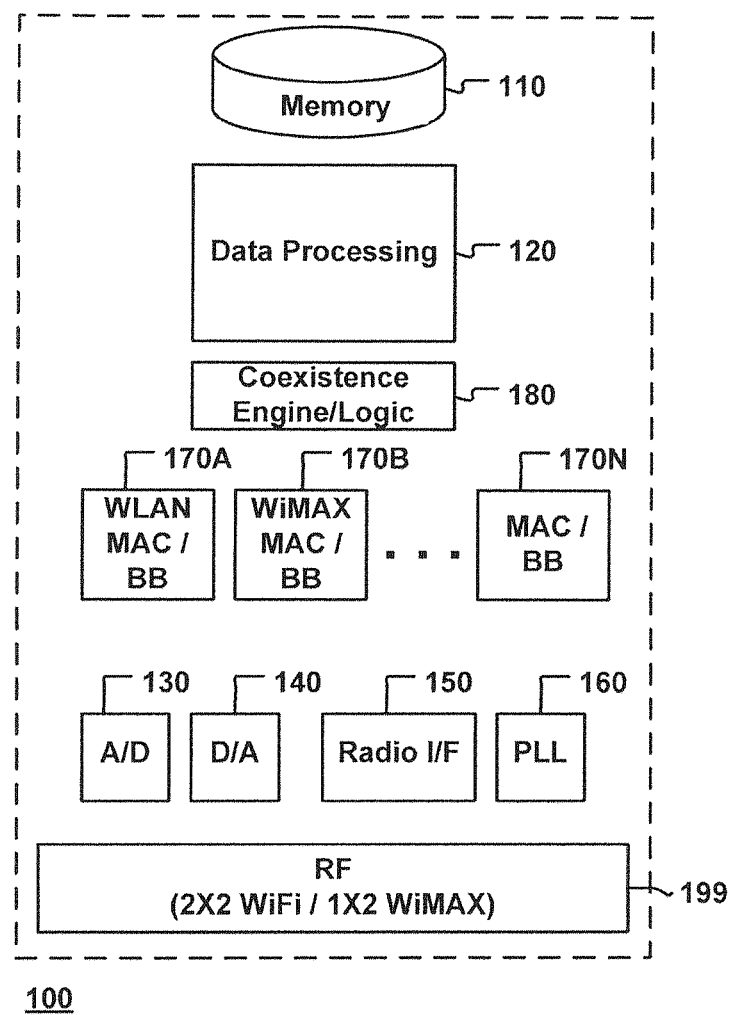
FIG. 2 is a simplified block diagram illustrating components of another embodiment of a multi-mode wireless handheld apparatus.

Turning now to the drawing figures, FIGS. 1 and 2 are simplified block diagrams illustrating components of embodiments of a multi-mode wireless handheld apparatus. In one embodiment, the various components of FIG. 1, with the exception of a radio element (i.e., radio frequency (RF) component, reference numeral 199), may be associated with or incorporated into a single chip or integrated circuit as indicated by the dashed box. In the alternative embodiment illustrated in FIG. 2, RF component 199 may be associated with or integrated into the same chip as the other components.

As indicated in FIGS. 1 and 2, a multi-mode wireless handheld apparatus 100 may generally comprise a data storage component or memory 110, one or more computational components or data processors (reference numeral 120), and various media access controller (MAC) and baseband (BB) elements as indicated at reference numerals 170A-170N. Apparatus 100 may engage in wireless communications via RF component 199, under control of MAC/BB elements 170A-170N through a radio interface (I/F) 150, as set forth in detail below.

Though illustrated as a single component for clarity, memory 110 may be embodied in or comprise any number of various hardware elements operative to store data useful for enabling or facilitating wireless communications. Memory 110 may include, for example, volatile or non-volatile data storage components such as random access memory (RAM) elements, read-only memory (ROM) elements, magnetic or optical disk drives, flash memory, or a combination of these and other components generally configured and operative to store digital data.

Data processing element 120 may be embodied in or comprise one or more microprocessors, microcontrollers, programmable logic controllers (PLCs), field programmable gate array (FPGA), application specific integrated circuits (ASICs), a non-transitory computer-readable medium with stored instructions configured to perform the disclosed functions, or a combination of these and other hardware elements capable of executing instruction sets having utility in wireless voice or data communications. In that regard, data processing element 120 may access data stored in memory 110 and execute instruction sets to enable or facilitate wireless communications functionality for apparatus 100. In operation, data processing element 120 may control or influence the functionality or operational characteristics of MAC/BB elements 170A-170N, a coexistence engine or logic (reference numeral 180) described below, RF component 199, and various other components of apparatus 100.

It will be appreciated that the particular implementation or architectural details of data processing element 120 may be application specific and may depend, for example, upon desired operational characteristics of apparatus 100, processing specifications associated with various communications protocols, bandwidth or data throughput requirements, cost considerations, or a combination of these and other factors. In some embodiments, it may be desirable that data processing element 120 comprise two microprocessors; alternatively, one microprocessor or microcontroller may be dedicated for use in conjunction with a respective MAC/BB element 170A-170N. In some such distributed processing embodiments, it may be desirable to include an additional processor to facilitate interaction between the MAC-dedicated processors and various software layers or other elements of protocol stacks. As data processing technologies and communications standards continue to advance, it may be desirable and cost-effective to implement data processing element 120 as a single multi-threading microprocessor or data processing engine.

MAC/BB elements 170A-170N may enable apparatus 100 to communicate in accordance with various wireless communications standards. In the embodiments illustrated in FIGS. 1 and 2, for instance, MAC/BB element 170A may be configured and operative to allow RF component 199 to communicate on a wireless local area network (WLAN) such as a network implementing one or more aspects of the IEEE 802.11 standard (i.e., a Wireless Fidelity, or "WiFi" network). In contrast, MAC/BB element 170B may be configured and operative to allow RF component 199 to communicate on a network employing one or more aspects of the Worldwide Interoperability for Microwave Access (or "WiMAX") communication standard (i.e., IEEE 802.16).

Any number of other MAC/BB elements 170N may be incorporated into apparatus 100, depending upon, among other factors, a desire or requirement that apparatus 100 be compatible with a particular communication standard or protocol, the computational capabilities of data processing element 120, the overall functionality of RF component 199, hardware or integrated circuit manufacturing techniques, and associated costs. For example, the embodiment illustrated in FIG. 3 includes a MAC and a baseband element that may allow apparatus 100 to communicate via the Bluetooth™ standard; additionally, the FIG. 3 architecture may allow apparatus 100 to receive global positioning system (GPS) data. In some embodiments of apparatus 100 employing cellular technology, MAC/BB element 170N may be embodied in or comprise a cellular modem for wireless cellular voice and data communications. The present disclosure is not intended to be limited to any particular architectural arrangement of MAC/BB elements 170A-170N or to any specific MAC and baseband combination associated with a particular communications standard or protocol. For instance, in addition to the various standards set forth above, MAC/BB element 170N may be operative in accordance with any of various communications technologies including, but not limited to: frequency modulation (FM) radio; Global System for Mobile Communications (GSM); Enhanced Data for GSM Evolution (EDGE); General Packet Radio Service (GPRS); Universal Mobile Telecommunications System (UMTS); High-Speed Downlink Packet Access (HSDPA); High Speed Uplink Packet Access (HSUPA); Code Division Multiple Access (CDMA); Wideband CDMA; Evolution Data Optimized (EvDO); and Time Division Multiple Access (TDMA).

As set forth in more detail below with reference to FIGS. 3 and 4, coexistence engine 180 may generally control or otherwise influence operation of the various MAC/BB elements 170A-170N, either independently or in cooperation with data processing element 120; in that regard, coexistence engine 180 may act as an arbitrator with respect to access to RF component 199, i.e., via radio I/F 150. In some embodiments, coexistence engine 180 may take into account requirements, requests, or predictions (or a combination of these) associated with one or more of MAC/BB elements 170A-170N when allocating physical resources and access to RF component 199. For example, where WiMAX MAC/BB element 170B is currently handling a quality of service (QoS) packet with a relatively high priority and WLAN MAC/BB element 170A is handling a QoS packet having a relatively lower priority, then coexistence engine 180 may arbitrate in accordance with a predetermined QoS metric and thus determine which of MAC/BB elements 170A or 170B should be allocated immediate access.

Coexistence engine 180 may be implemented in hardware, for example, as a microprocessor, PLC, or other hardware logic component. Alternatively, coexistence engine 180 may be implemented in software as a computer program with executable instructions, tangibly stored on a non-transitory computer-readable medium as a virtual logic component; in this instance, data processing element 120 may execute instruction sets operative to arbitrate hardware resources as necessary or desired to allow apparatus 100 to communicate via RF component 199 in accordance with a selected one of a plurality of communications standards.

RF component 199 may be embodied in or comprise a radio transceiver enabling wireless voice and data communications. As illustrated in FIGS. 1 and 2, RF component 199 may be configured to support two send and two receive (2×2) WiFi chains, as well as one send and two receive (1×2) WiMAX chains. In other embodiments, RF component 199 may also support 2×2 WiMAX communications. Additionally or alternatively, apparatus 100 may include multiple independent transceivers (e.g., each of which may be configured to operate in accordance with a particular communication protocol or standard) to supplement or to replace the illustrated RF component 199. In some implementations, operational characteristics of such independent transceivers, as well as access to the resources of each transceiver by other components of apparatus 100, may be controlled, regulated, or otherwise influenced by coexistence engine 180 substantially as set forth below. Based on the disclosure and teachings provided herein, it will be appreciated that the structure and operation of numerous embodiments of RF component 199 are generally well understood, and may be application specific, depending upon the type and nature of the communications standards employed by the various other components of apparatus 100.

Those of skill in the art will appreciate that apparatus 100 may also comprise or incorporate, among other things, an analog to digital (A/D) converter 130, a digital to analog (D/A) converter 140, radio I/F 150, and one or more phase-locked loops 160. The general operation of these components and their respective utilities in wireless handset applications are well understood.

Figure 3:
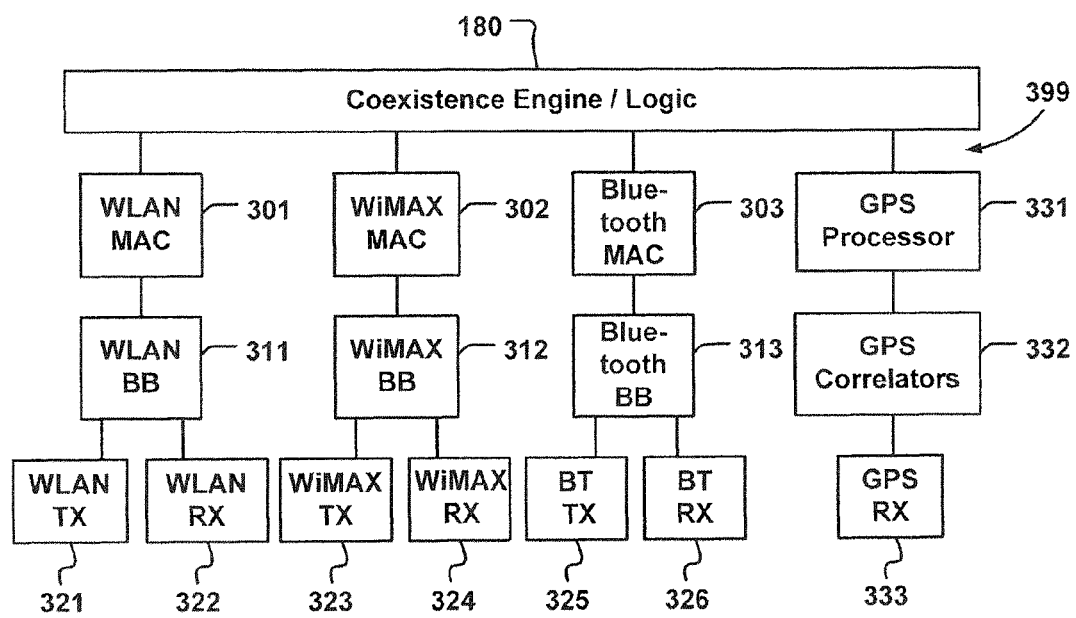
FIG. 3 is a simplified block diagram illustrating architectural implementation details of one embodiment of a multi-mode wireless handheld apparatus.

It will be appreciated that baseband and MAC components that are tightly coupled (as illustrated in FIGS. 1-3) contribute efficiencies to the overall architecture of apparatus 100 as well as to the performance and quality of voice and data communications. Additionally, since memory 110, RF component 199, radio I/F 150, and other hardware components may be shared among the various MAC/BB elements 170A-170N, overall size of the integrated circuitry incorporated into apparatus 100 may be reduced, e.g., as compared to the overall circuit real estate required if multiple independent radios and memories were employed.

Figure 4:
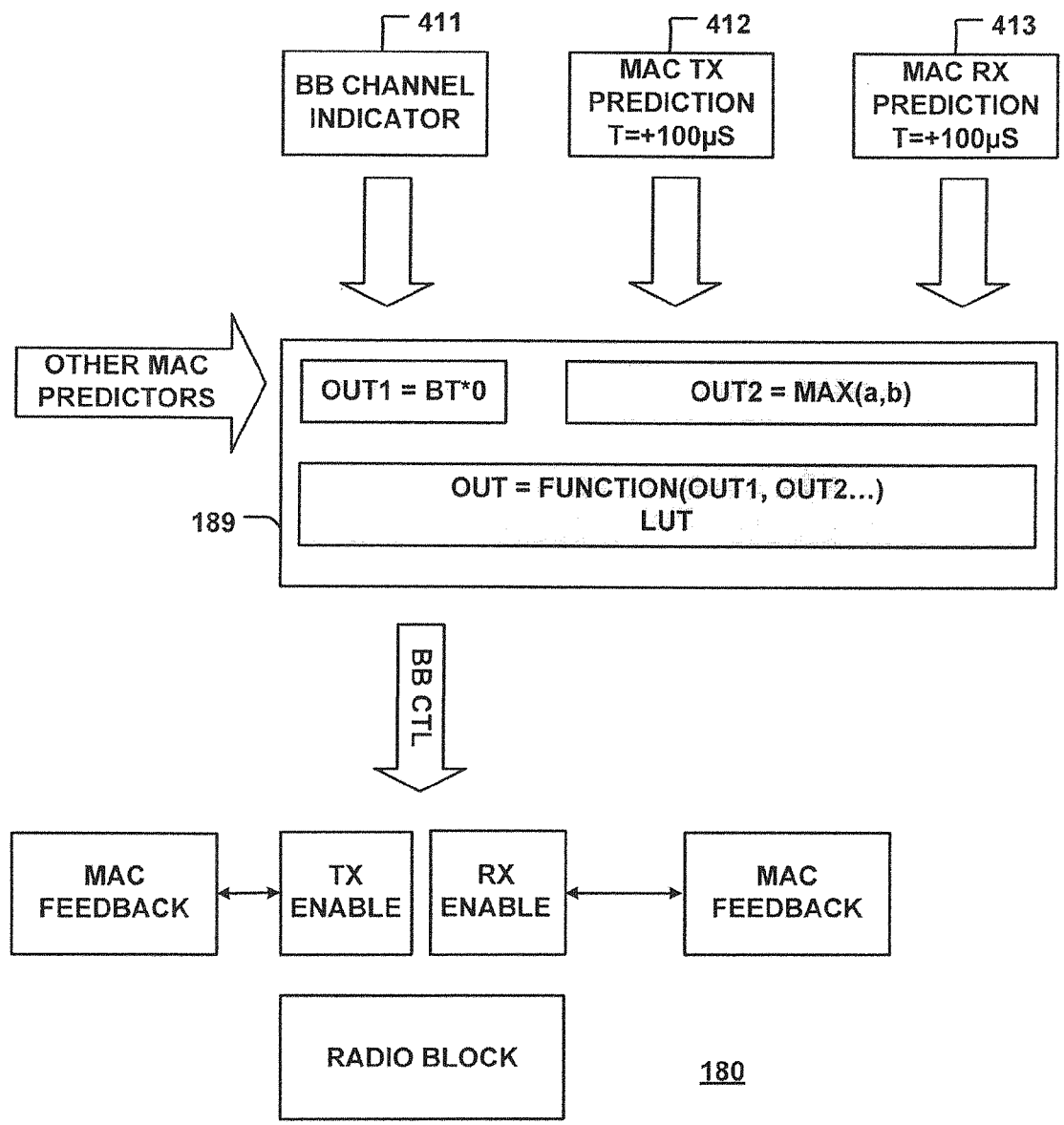
FIG. 4 is a simplified block diagram illustrating a single media access controller connection to a coexistence engine.

FIGS. 3 and 4 illustrate, by way of example, interconnection and interoperability between a coexistence engine 180 and a MAC. In that regard, FIG. 3 is a simplified block diagram illustrating architectural implementation details of one embodiment of a multi-mode wireless handheld apparatus. FIG. 4 is a simplified block diagram illustrating a single media access controller connection to a coexistence engine.

FIG. 3. illustrates one strategy for coupling various wireless radio systems to coexistence engine 180. As set forth above with reference to FIGS. 1 and 2, any number of additional MAC/BB systems may be coupled to, or interoperate with, coexistence engine 180 in a manner similar to that depicted in FIG. 3. In the illustrated embodiment, MAC element 301, BB radio component 311, and their associated transmitter and receiver (reference numerals 321 and 322, respectively) support WLAN or WiFi communications. Similarly, MAC element 302, BB radio component 312, and their associated transmitter and receiver (reference numerals 323 and 324, respectively) support WiMAX communications, whereas MAC element 303, BB radio component 313, and their associated transmitter and receiver (reference numerals 325 and 326, respectively) support Bluetooth™ communications. Finally, a GPS processor 331, correlator 332, and receiver 333 enable reception and processing of global positioning information related to the location of apparatus 100 incorporating the hardware components indicated in FIG. 3.

In operation, each respective MAC element 301-303 may deliver predictive data or other relevant information associated with the state or use of its respective baseband radio component 311-313 to coexistence engine 180; similarly, GPS processor 331 may provide predictive data or other relevant information associated with use of receiver 333. In the event of conflicting requests for access to resources, coexistence engine 180 may execute arbitration processing operations to determine efficient or otherwise appropriate allocation of such resources. In that regard, coexistence engine 180 may implement any number of various arbitration algorithms (e.g., employing priority assignments, QoS metrics, past history, expected future bandwidth requirements or limitations, and the like), either independently or in cooperation with data processing element 120, to allocate access to RF component 199 in accordance with a predetermined or dynamically adjusted rule set.

When a particular MAC and its associated BB are assigned (i.e., by coexistence engine 180) priority to access RF component 199 as set forth above, their associated transmitter and receiver components may gain access to radio resources through interaction with radio I/F 150 illustrated in FIGS. 1 and 2.

Although coexistence engine 180 is illustrated in FIG. 3 as coupled directly to MAC elements 301-303 and GPS processor 331 (at an interface 399), coexistence engine 180 may, additionally or alternatively, be coupled indirectly to these or other components, for example, via connection through external RF elements (such as switches) facilitated by appropriate enable signals. The simplified generic architecture illustrated in FIG. 3 is provided for clarity and by way of example only; the present disclosure is not intended to be limited to implementations employing a direct connection or interface 399 between a MAC element and coexistence engine 180.

FIG. 4 illustrates a simplified single MAC connection to coexistence engine 180. As noted above, any number of additional MAC components may be coupled to coexistence engine 180 in a manner similar to that depicted in FIG. 4; connections to additional MAC components are represented by the arrow labeled "Other MAC Predictors" on the left side of FIG. 4.

Computation core 189 may execute, enable, or otherwise facilitate the arbitration functionality of coexistence engine 180. In the illustrated embodiment, core 189 may receive data or information associated with a BB channel indicator 411, as well as predictive transmission data 412 and predictive reception data 413 from the MAC.

FIG. 4 illustrates, by way of example, a combinatorial logic implementation running at core 189. In particular, BB channel indicator data received from the MAC may be employed as arguments or variables in a mathematical function, and a result (OUT1) may be determined; alternatively, OUT1 may simply represent the BB channel. Similarly, predictive transmission data and predictive reception data may be employed as arguments or variables in a different mathematical function or algorithm, and a different result (OUT2) may be determined; given the logic implemented by core 189 in the FIG. 4 example, OUT2 simply represents the longer of two time durations. The foregoing results (i.e., OUT1 and OUT2) may be employed as arguments or variables in yet a different mathematical function or algorithm, the result of which (OUT) may be compared to values in a look up table (LUT), for example, to determine an appropriate manner in which to allocate resources. Following such a comparison or equivalent processing operations, core 189 may output a signal ("BB CTL" in FIG. 4) suitable to provide necessary or desired instructions to control operation of the BB radio and MAC element. For example, if a competing MAC and BB have priority, the output signal BB CTL may limit or otherwise regulate access to radio resources or restrict access to RF component 199 for other components. As an alternative to the foregoing combinatorial logic, core 189 may employ a clocked engine which may be better suited to implement logic or to execute simple firmware instruction sets more efficiently.

In some embodiments, the signal BB CTL may be a specific control signal transmitted to the specific MAC/BB block (such as, for example, 170A in FIGS. 1 and 2, which represents a combination of blocks 301 and 311 in FIG. 3) being controlled by coexistence engine 180. Accordingly, the illustrated architecture may be combined with additional similar logical blocks (e.g., each controlling a respective MAC/BB combination) to form a distributed logic block effectively to arbitrate an entire system's radio coexistence. In alternative embodiments employing more sophisticated logic or data processing strategies, a single core 189 may be implemented to control operation of multiple MAC/BB combinations by addressing a control signal (such as BB CTL) to a particular combination, for instance, or by broadcasting a single signal to every MAC/BB combination in the system.

In order to improve coexistence performance, it may be desirable to implement standard RF filtering techniques, for example, to control radio emissions noise resulting from the transmitter and receiver blocks illustrated in FIGS. 3 and 4; additionally or alternatively, filtering strategies may be employed to restrict the out of band interferers accepted by the receiver blocks. Further, those of skill in the art will appreciate that other deleterious effects such as spurious tones and various other interfering signals may be minimized or eliminated using appropriately targeted filtering techniques.

Figure 5:
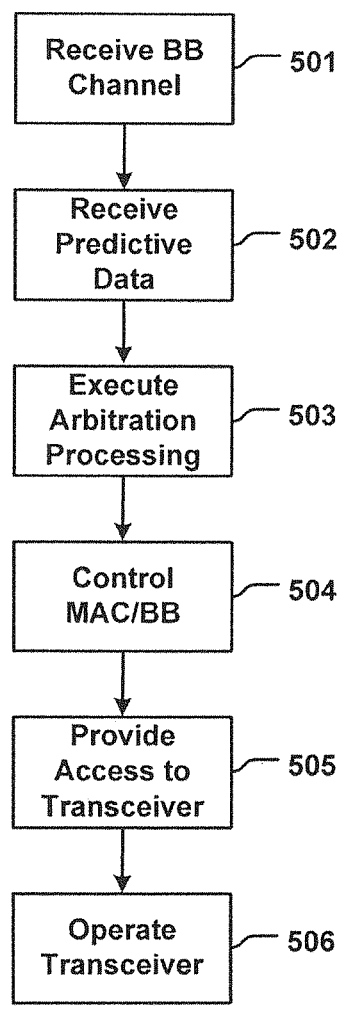
FIG. 5 is a simplified flow diagram illustrating general operation of one embodiment of a method of controlling a multi-mode wireless handheld apparatus.

FIG. 5 is a simplified flow diagram illustrating general operation of one embodiment of a method of controlling a multi-mode wireless handheld apparatus. In some implementations, the method depicted in FIG. 5 may be executed by the hardware elements described above.

A method of controlling a multi-mode wireless handheld apparatus may begin by receiving baseband channel information or data (block 501) and predictive data (block 502). As set forth above, such predictive data may be associated with expected, anticipated, or predicted requirements of a baseband element coupled to a media access controller. It will be appreciated that the operations depicted at blocks 501 and 502 may be reversed (i.e., the receiving process at block 502 may precede the receiving process at block 501) or executed substantially simultaneously. Moreover, one or both of these operations may be executed iteratively, either with respect to a single MAC/BB element or with respect to multiple MAC/BB elements. In some embodiments, for example, the receiving operations depicted at blocks 501 and 502 may be executed with respect to each of a plurality of MAC/BB combinations sequentially; when appropriate data from the last MAC/BB combination in the sequence are received, processing may return to the beginning of the sequence.

Responsive at least in part to the data received at blocks 501 and 502, arbitration processing may be executed as indicated at block 503. As set forth above, a coexistence engine implementing appropriate logic or computer executable instructions may determine which of a plurality of MAC/BB combinations may access a transceiver to engage in voice or data communications. In some embodiments, this arbitration processing may be distributed logically (e.g., an independent logical block may be responsible for controlling a respective MAC/BB combination). As set forth above with reference to FIG. 4, QoS metrics, priority assignments, and other factors (such as time of day and past history of resource usage) may be taken into consideration. Various arbitration algorithms and resource allocation strategies may be employed.

Control signals may be sent to the various MAC/BB combinations as indicated at block 504, and the MAC with priority may be provided with access to the transceiver as indicated at block 505, while other MAC/BB elements may be shut down or instructed to stand-by, for example, and may accordingly be apprised of the status of a queue. As indicated at block 506, the transceiver may operate in accordance with the communications standard dictated by the MAC/BB combination that has current access.

Several features and aspects of the present disclosure have been illustrated and described in detail with reference to particular embodiments by way of example only, and not by way of limitation. Those of skill in the art will appreciate that alternative implementations and various modifications to the disclosed embodiments are within the scope and contemplation of the present disclosure. Therefore, it is intended that the disclosure be considered as limited only by the scope of the appended claims.

What is claimed is:

1. An apparatus comprising:
   a radio frequency (RF) component;
   a first media access controller (MAC) and a first baseband (BB) configured to allow the radio frequency (RF) component to communicate in accordance with a first wireless communication standard, wherein the first media access controller is further configured to generate predictive data that predicts when transmission is expected by the first MAC as required by the first baseband;
a second media access controller (MAC) and a second baseband (BB) configured to allow the radio frequency (RF) component to communicate in accordance with a second wireless communication standard, wherein the second wireless communication standard is different from the first wireless communication standard;
a lookup table configured to generate a baseband control signal to regulate access to the RF component by using at least the predictive data as an input into the lookup table; and
a coexistence engine configured to arbitrate, based at least in part on the baseband control signal from the lookup table, access of the radio frequency (RF) component to (i) the first media access controller (MAC) and the first baseband (BB) or (ii) the second media access controller (MAC) and the second baseband (BB), wherein the first MAC is configured to provide the predictive data to the coexistence engine.

2. The apparatus of claim 1, wherein:
the first media access controller is further configured to generate data predicting reception as required by the first baseband; and
wherein the coexistence engine is configured to arbitrate, further based at least in part on the predictive data that includes data predicting when reception is expected to occur by the first MAC as required by the first baseband, access of the radio frequency (RF) component to (i) the first media access controller (MAC) and the first baseband (BB) or (ii) the second media access controller (MAC) and the second baseband (BB), wherein the predictive data includes information that indicates a prediction of when the first MAC will request access to the RF component.

3. The apparatus of claim 1, wherein the first wireless communication standard comprises the Bluetooth communication standard, and wherein the second wireless communication standard comprises an IEEE 802.11 communication standard.

4. The apparatus of claim 1, wherein the first wireless communication standard comprises a cellular communication standard, and wherein the second wireless communication standard comprises an IEEE 802.11 communication standard.

5. The apparatus of claim 1, wherein the radio frequency (RF) component comprises a radio transceiver.

6. The apparatus of claim 1, wherein each of (i) the radio frequency (RF) component, (ii) the first media access controller (MAC) and the first baseband (BB), (iii) the second media access controller (MAC) and the second baseband (BB), and (iv) the coexistence engine are integrated into a same chip.

7. The apparatus of claim 1, wherein:
each of (i) the first media access controller (MAC) and the first baseband (BB), (ii) the second media access controller (MAC) and the second baseband (BB), and (iii) the coexistence engine are integrated into a first chip; and
the radio frequency (RF) component is integrated into a second chip separate from the first chip.

8. The apparatus of claim 1, wherein the apparatus comprises a handheld apparatus.

9. A method for arbitrating access of a radio frequency (RF) component to (i) a first media access controller (MAC) and a first baseband (BB) or (ii) a second media access controller (MAC) and a second baseband (BB), wherein the first media access controller (MAC) and the first baseband (BB) are configured to allow the radio frequency (RF) component to communicate in accordance with a first wireless communication standard, wherein the second media access controller (MAC) and the second baseband (BB) are configured to allow the radio frequency (RF) component to communicate in accordance with a second wireless communication standard different from the first wireless communication standard, the method comprising:
generating predictive data, by the first MAC, that predicts when transmission by the first MAC is expected as required by the first baseband;
generating, according to a lookup table, a baseband control signal to regulate access to the RF component by using at least the predictive data as an input to the lookup table into the lookup table; and
arbitrating, based, at least in part, on the baseband control signal from the lookup table, access of the radio frequency (RF) component to (i) the first media access controller (MAC) and the first baseband (BB) or (ii) the second media access controller (MAC) and the second baseband (BB).

10. The method of claim 9, further comprising generating the predictive data to include data predicting when reception by the first MAC is expected as required by the first baseband, wherein the arbitration of access of the radio frequency (RF) component to (i) the first media access controller (MAC) and the first baseband (BB) or (ii) the second media access controller (MAC) and the second baseband (BB) is further based at least in part on the data predicting reception as required by the first baseband, wherein the predictive data includes information that indicates a prediction of when the first MAC will request access to the RF component.

11. The method of claim 9, wherein the first wireless communication standard comprises the Bluetooth communication standard, and wherein the second wireless communication standard comprises an IEEE 802.11 communication standard.

12. The method of claim 9, wherein the first wireless communication standard comprises a cellular communication standard, and wherein the second wireless communication standard comprises an IEEE 802.11 communication standard.

13. The method of claim 9, wherein the radio frequency (RF) component comprises a radio transceiver.

14. A computer program, tangibly stored on a non-transitory computer-readable medium, for arbitrating access of a radio frequency (RF) component to (i) a first media access controller (MAC) and a first baseband (BB) or (ii) a second media access controller (MAC) and a second baseband (BB), wherein the first media access controller (MAC) and the first baseband (BB) are configured to allow the radio frequency (RF) component to communicate in accordance with a first wireless communication standard, wherein the second media access controller (MAC) and the second baseband (BB) are configured to allow the radio frequency (RF) component to communicate in accordance with a second wireless communication standard different from the first wireless communication standard, the computer program comprising instructions, executable by a processor, to:
generate predictive data, by the first MAC, that predicts when transmission by the first MAC is expected as required by the first baseband;

generate, according to a lookup table, a baseband control signal to regulate access to the RF component by using at least the predictive data as an input to the lookup table into the lookup table; and arbitrate, based, at least in part, on the baseband control signal from the lookup table, access of the radio frequency (RF) component to (i) the first media access controller (MAC) and the first baseband (BB) or (ii) the second media access controller (MAC) and the second baseband (BB).

15. The computer program of claim 14, further comprising instructions to generate the predictive data to include data predicting when reception by the first MAC is expected as required by the first baseband, wherein the instructions to arbitrate access of the radio frequency (RF) component to (i) the first media access controller (MAC) and the first baseband (BB) or (ii) the second media access controller (MAC) and the second baseband (BB) comprise instructions to arbitrate access of the radio frequency (RF) component further based at least in part on the data predicting reception as required by the first baseband, wherein the predictive data includes information that indicates a prediction of when the first MAC will request access to the RF component.

16. The computer program of claim 14, wherein the first wireless communication standard comprises the Bluetooth communication standard, and wherein the second wireless communication standard comprises an IEEE 802.11 communication standard.

17. The computer program of claim 14, wherein the first wireless communication standard comprises a cellular communication standard, and wherein the second wireless communication standard comprises an IEEE 802.11 communication standard.

\* \* \* \* \*